(12) United States Patent
Baffes et al.

(10) Patent No.: US 7,552,472 B2
(45) Date of Patent: Jun. 23, 2009

(54) DEVELOPING AND ASSURING POLICY DOCUMENTS THROUGH A PROCESS OF REFINEMENT AND CLASSIFICATION

(75) Inventors: Paul T. Baffes, Austin, TX (US); John Michael Garrison, Austin, TX (US); Michael Gilfix, Austin, TX (US); Allan Hsu, Centerville, OH (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 10/324,502

(22) Filed: Dec. 19, 2002

(65) Prior Publication Data

US 2004/0123145 A1 Jun. 24, 2004

(51) Int. Cl.
*G06F 15/177* (2006.01)

(52) U.S. Cl. .............................. 726/22; 726/1; 709/223; 709/224; 709/225

(58) Field of Classification Search .................... 726/22, 726/1; 709/223, 224, 225
See application file for complete search history.

(56) References Cited

U.S. PATENT DOCUMENTS

| | | | |
|---|---|---|---|
| 5,557,742 A * | 9/1996 | Smaha et al. ................. | 726/22 |
| 6,167,445 A | 12/2000 | Gai et al. | |
| 6,230,271 B1 | 5/2001 | Wadlow et al. | |
| 6,243,747 B1 | 6/2001 | Lewis et al. | |
| 6,301,613 B1 | 10/2001 | Ahlstrom et al. | |
| 6,308,216 B1 | 10/2001 | Goldszmidt et al. | |
| 6,327,618 B1 | 12/2001 | Ahlstrom et al. | |
| 6,347,374 B1 * | 2/2002 | Drake et al. .................... | 726/1 |
| 6,530,024 B1 * | 3/2003 | Proctor ......................... | 726/23 |
| 6,898,737 B2 * | 5/2005 | Goeller et al. ................ | 714/39 |
| 7,124,438 B2 * | 10/2006 | Judge et al. ................... | 726/22 |
| 2002/0091942 A1 * | 7/2002 | Cooper et al. ................ | 713/201 |

FOREIGN PATENT DOCUMENTS

WO    WO 00/00879    1/2000

* cited by examiner

*Primary Examiner*—Kimyen Vu
*Assistant Examiner*—Edward Zee
(74) *Attorney, Agent, or Firm*—Dillon & Yudell LLP

(57) ABSTRACT

A system and method for developing network policy document and assuring up-to-date monitoring and automated refinement and classification of the network policy. The system administrator defines an initial policy document that is provided as the initial symbolic classifier. The classification rules remain in human readable form throughout the process. Network system data is fed through the classifier, which labels the data according to whether a policy constraint is violated. The labels are tagged to the data. The user then reviews the labels to determine whether the classification is satisfactory. If the classification of the data is satisfactory, the label is unaltered; However, if the classification is not satisfactory, the data is re-labeled. The re-labeled data is then introduced into a refinement algorithm, which determines what policy must be modified to correct classification of network events in accordance with the re-labeling. The network administrator then inspects the resulting new policy and modifies it if necessary. An updated classifier replaces the previous classifier.

28 Claims, 5 Drawing Sheets

US 7,552,472 B2

DEVELOPING AND ASSURING POLICY DOCUMENTS THROUGH A PROCESS OF REFINEMENT AND CLASSIFICATION

CROSS REFERENCE TO RELATED APPLICATIONS

The present application shares specification text and figures with the following co-pending application, which was filed concurrently with the present application: application Ser. No. 10/324,514 titled "Suggesting data interpretations and patterns for updating policy documents," the entire contents of which are incorporated herein by reference.

BACKGROUND OF THE INVENTION

1. Technical Field

The present invention relates generally to data processing systems and in particular to security of data processing systems. Still more particularly, the present invention relates to a method, system, and program product for developing policy documents that provide up-to-date monitoring and security features for data processing systems and networks.

2. Description of the Related Art

The utilization of computer networks by companies and corporations has become the norm for internal communication and sharing of information and assets. Many business today have an internal network that connects the employee terminals to a central server (or server banks). These networks are often connected to an external network, such as the Internet. In certain situations the business network comprises external customer systems as in online retail businesses, etc.

Networks require maintenance, and most networks are maintained by a system administrator, who is responsible for upkeep of the network and security of the network. Security is becoming increasingly important as many businesses maintain valuable company assets on their network. In addition, business offering customer services over their networks are increasingly concerned about the security of the online transactions and services provided. As the need for security increases and more and more companies utilize their networks to carry out day to day business and transmit secure information, the burden of system administration has greatly increased.

Current methods by which a network administrator is able to ensure that a network is utilized properly, while maintaining network security, include utilization of a policy document. The security policy document is a series of statements, or constraints, on network resources that should be respected by the users of the system. The policy document defines the proper use of the network. The document is important because the document helps to define assets within a network and the proper use of these assets. Ideally, the document is written in a language that very closely resembles human readable language, which can be translated into a form usable by the computer.

The initial policy document is created by system administration, who spends a significant amount of time deciding on the various rules to apply to the particular network. Since each network is different, the rules provided for one network may be very different for another network. The policy document is network specific because the document is closely tied to the needs of the business, or entity, that is utilizing the network. Thus, each network requires the creation of an initial policy document, often completely. Notably also, the policy document does not change in response to changes in the network. Rather, the document only changes in response to an individual's idea of how the network services should be utilized and the resources allocated.

Irrespective of these shortcomings, many networks utilize policy documents because the policy documents are crucial for managing business processes and resources. The policy documents define what assets to protect, how and when those assets are to be protected. The policy documents serve as a baseline for performance and quality assessment, as well as means for communicating those criteria to others. In the context of network security, policy documents define what constitutes appropriate utilization of network resources, when those resources should be utilized, and by whom.

While prominent security organizations like SANS insist that a formal information security policy document is fundamental to the security of any network, few organizations have one. The lack of formal security policy documents is primarily because creating a formal security policy document is a daunting and time intensive task and offers no immediate benefit. A typical network has a very large number of operating features that has to be described; yet once these features are captured within the security policy document, the life of the network administrator is still not made easier. Most notably, changes in the network are not captured by the security policy document currently in place, and the security policy document may easily become ineffective when major changes occur in the network.

Thus, despite the introduction of the policy document, there is presently no mechanism available to enable the System Administrators (SAs) to easily generate or update a policy document that would provide up-to-date network usage data and security.

SUMMARY OF THE INVENTION

Disclosed is a system and method for developing network policy document and assuring up-to-date monitoring and automated refinement and classification of the network policy. The system administrator defines an initial policy document that is provided as the initial symbolic classifier. The classification rules remain in human readable form throughout the process. Network system data is fed through the classifier, which labels the data according to whether a policy constraint is violated. The labels are tagged to the data. The user then reviews the labels to determine whether the classification is satisfactory. If the classification of the data is satisfactory, the label is unaltered; however, if the classification is not satisfactory, the data is re-labeled.

The re-labeled data is then introduced into a refinement algorithm, which determines what policy must be modified to correct classification of network events in accordance with the re-labeling. The network administrator then inspects the resulting new policy and modifies it if necessary. The new classifier replaces the previous classifier. Policy features within the policy document accordingly grows to better reflect the network described by the policy document.

As claimed, the invention provides a system and method for modifying and monitoring network policy in an interactive manner. System data is analyzed via a software classifier that includes a set of initial policy constraints. When the software classifier indicates that a particular system data does not comply with said initial policy constraints, the initial policy constraints are modified to account for the particular system data and an updated software classifier is created via theory refinement.

The process of updating the software classifier includes labeling each data with a label that indicates whether or not the block of data complies with the initial policy constraints. The data that does not comply with the policy constraints are provided to a user, who re-labels the data. The re-labeled data is provided to a refinement algorithm designed to determine which policy is to be modified to correct classification of events according to their re-labeling. The modified policy is outputted to a network administrator for inspection, and upon approval by the system administrator, a new classifier is implemented.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention addresses the need for a policy document implementation that provides monitoring of network usage and security, which provides semi-automatic updates when new events occurring on the network are discovered. That is, the policy document is frequently updated and remains substantially current to ensures that the monitored usage are effective and security concerns are addressed in light of changes occurring to and/or within the network. The invention provides a computer-implemented method and system that allows the system administrator to be made aware of new events as they occur and to modify the policy document to account for these new events with substantially less effort than previously required.

The invention further provides assistance to the system administrator to aid in updating the policy documents that track the security of operations on the network. The policy is evaluated against the system on a regular basis and then the policy is refined by the semi-automated process that includes the interaction of the system administrator. Thus, the utilization of a policy document to monitor network usage and provide security to the network becomes less time-consuming for a system administrator.

According to the described embodiment, the constraints of a policy document statement are provided in human language. These constraints also resolve to boolean equivalents when evaluated on their respective data sets, indicating whether or not the constraint was violated, and are subject to the combination of multiple boolean operators. System data is mapped against these constraints to produce a label indicating whether the data satisfies or violates any constraints. The label is then used to train a symbolic classifier to recognize those constraints.

Figure 1A:
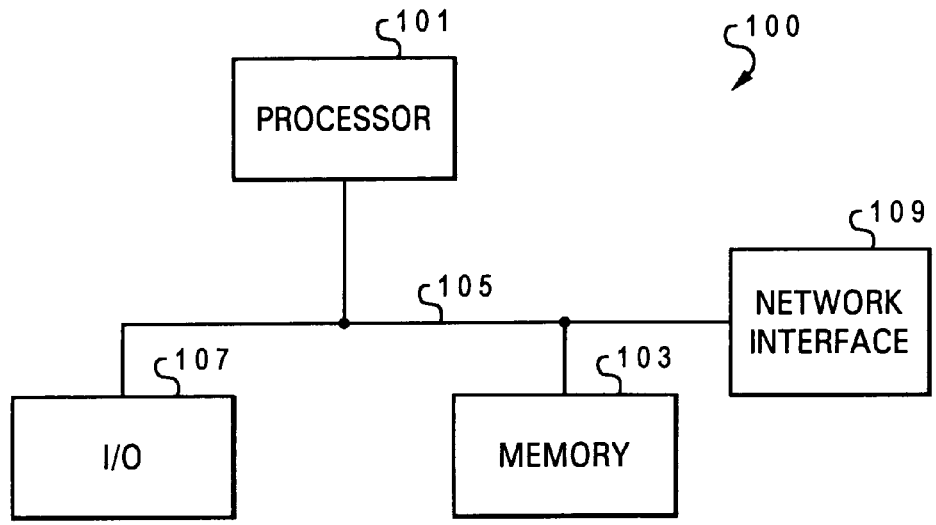
FIG. 1A is a block diagram representation of a data processing system in which the features of the present invention may be implemented.

Referring now to the figures, and in particular to FIG. 1A, there is illustrated the major components of a data processing system within which the semi-automated features of the invention may be implemented. Data processing system 100 comprises processor 101 coupled to memory 103 via interconnect 105. Data processing system 100 also comprises Input/Output (I/O) component 107, by which a system administrator or other user may interact with data processing system 100 or receive output of processes occurring on data processing system 100. Data processing system also includes network interface 109, with which data processing system 100 connects to an external network. Network interface may be a modem, ethernet card, or similar component.

Figure 3A:
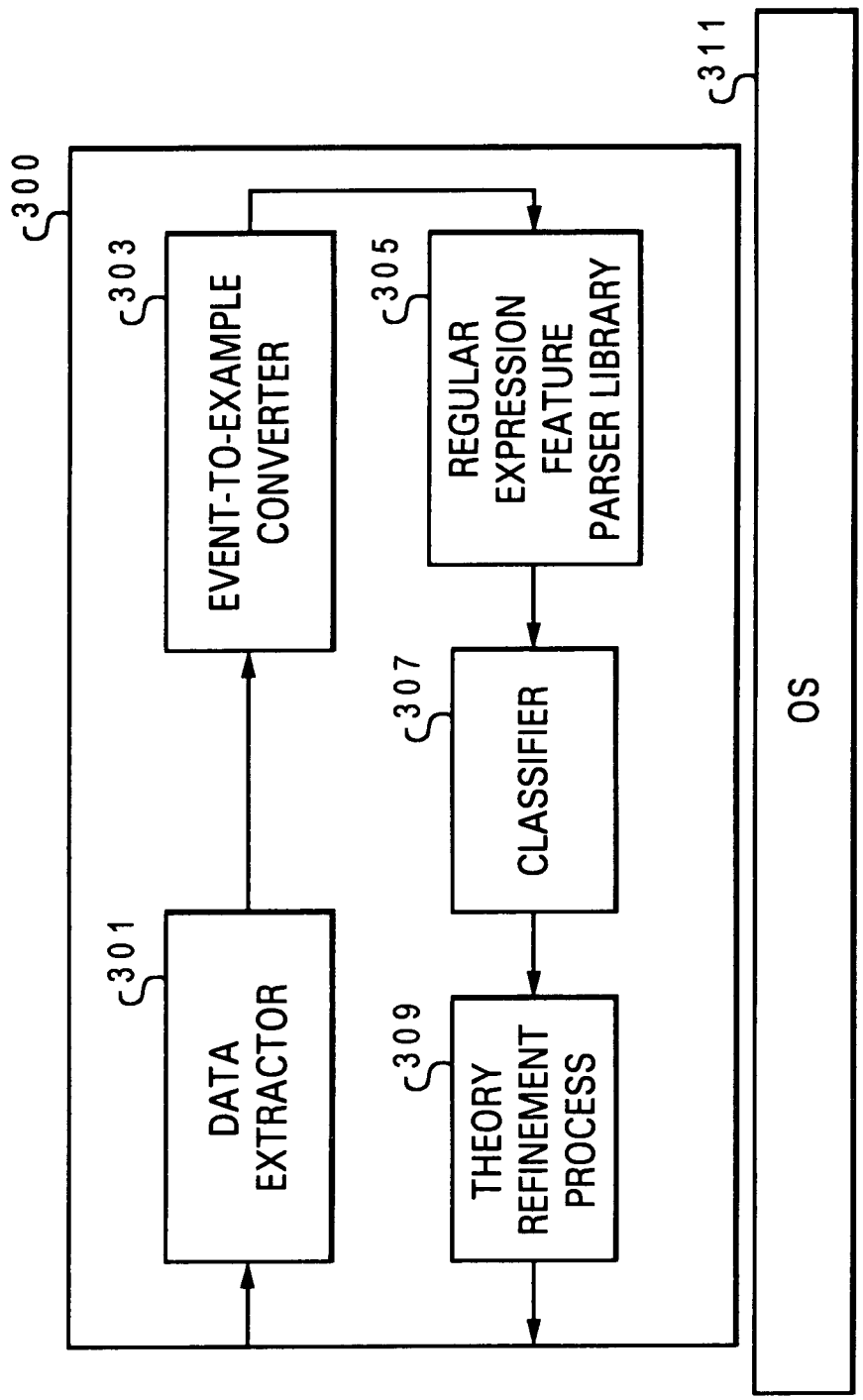
FIG. 3A illustrates the software modules that complete the semi-automated processes of theory refinement and policy document updates according to one illustrative embodiment of the invention.

In addition to these hardware components, dataprocessing system 100 comprises software components (illustrated in FIG. 3A shown), which, when executed by processor 101, implement the dynamic and/or semi-automated processes of the invention. The software components are stored on a medium that is readable by processor 101. Included in these software components is an Operating System (OS) and policy document.

Figure 2:
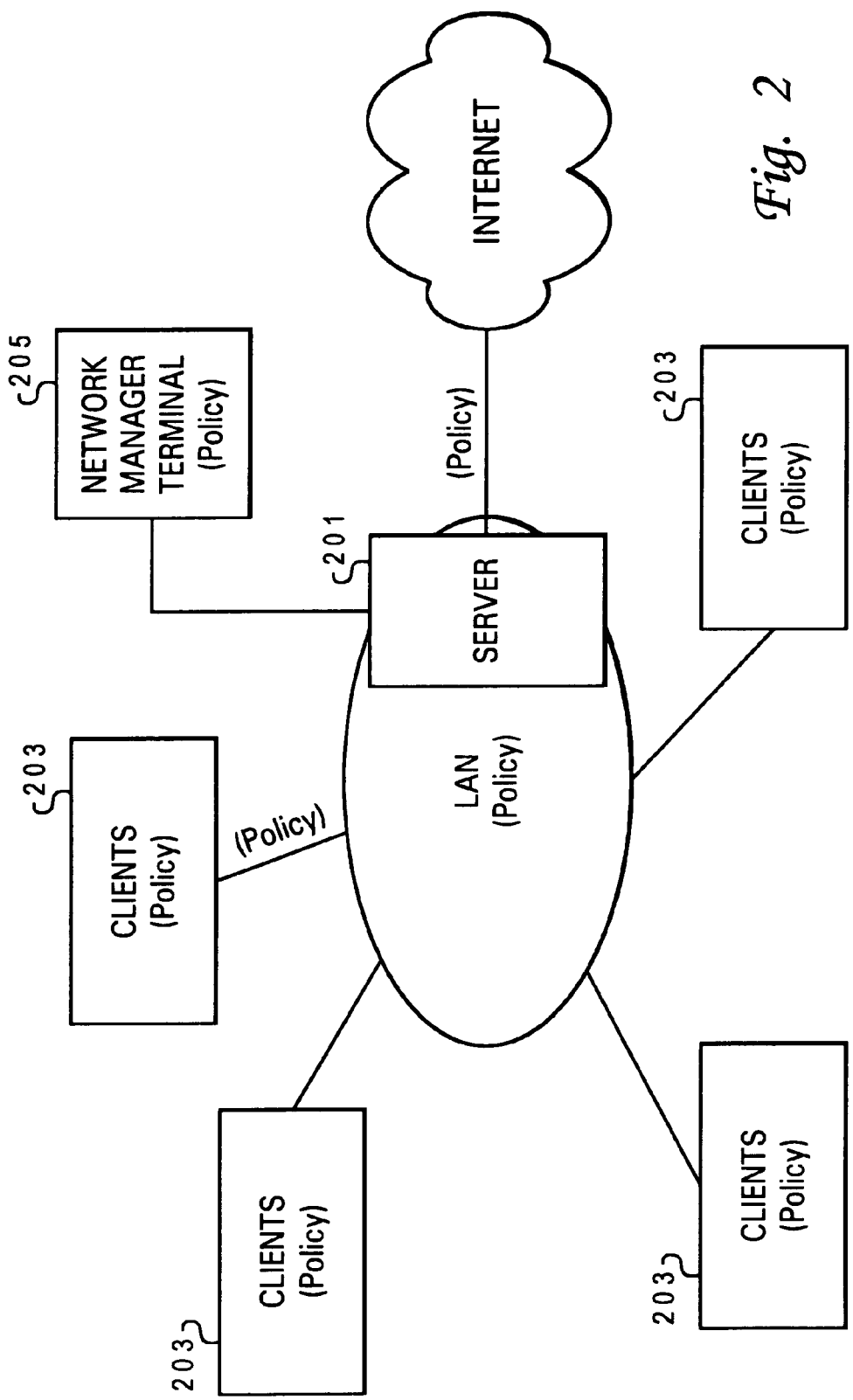
FIG. 2 is a block diagram representation of a network system within which the security features provided by a policy document are implemented in accordance with the present invention.

FIG. 2 illustrates a basic network comprising server 201 and several nodes at which are coupled network terminals 203. Network terminals may be data processing systems configured similarly to those of FIG. 1A. In particular, according to the illustrative embodiment of the invention, server 201 is configured as data processing system 100. Access to server 201 is provided by network administrator terminal 205, although, any one of terminals 203 may also provide access when correct administrative login is provided. Actual configuration of network is not key to the implementation of the invention. However, according to the illustrative embodiment, events occurring on the network passes through or are directed to a particular collection point that serves as the database of events that is utilized as the input to the invention processes.

Figure 1B:
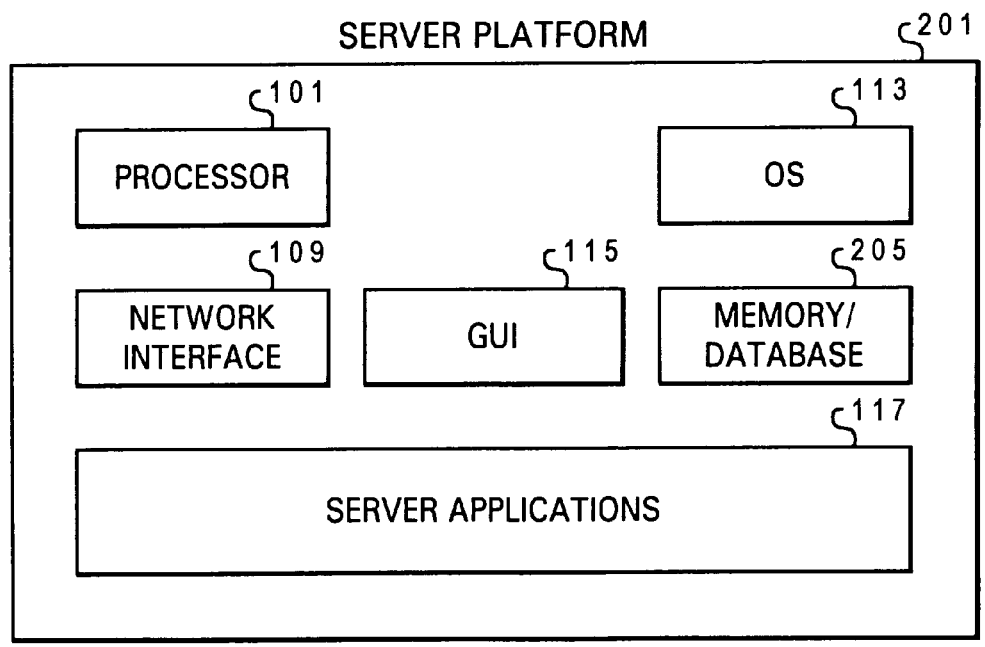
FIG. 1B is a block diagram representation of a server platform with basic hardware and software components illustrated as block modules and within which the features of the present invention may be implemented.

FIG. 1B is a block diagram representation of sever 201, which comprises several similar components with data processing system 100 of FIG. 1A, and in which the data interpretation and network administrative features of the invention may be implemented. As shown, server 201 comprises several hardware components including processor 101, memory/database 205, and network interface 109. Server 201 also comprises software components including OS 113, graphical user interface (GUI) 115, and server applications 117. In the illustrative embodiment, server 201 provides the features of the invention utilizing specific server applications installed on server by system administrator. GUI 115 enables the system administrator to view the event examples prior to updating the policy documents, etc. as is described in greater detail below.

A general overview of the invention is now presented. The initial security policy document is written or generated and provided as an initial symbolic classifier. Then network system data is fed through the symbolic classifier, which then labels according to whether the data has violated a policy constraint. At this point, the application implementing this process would present the resulting labels to a human network administrator and possibly alert the network if an important policy has been violated.

The network administrator can then choose to do one of two things: if he is satisfied with the classification, he can choose to do nothing, otherwise, he can re-label the data as he felt it should have been labeled. The re-labeled data is then fed through a theory refinement. Theory refinement is a set of algorithms that refine rule sets and which determines what parts of the policy need to be modified to classify events in accordance with the network administrator's re-labeling. The network administrator is then given the new policy for inspection and for any desired modification. Finally, the old classifier is replaced by the new, updated classifier for classifying system data or events.

Throughout every iteration of the process, the policy grows and changes to better reflect the particulars of the network being described. The invention enables a network administrator to ensure that the security of his network is being maintained and that the users are following the established usage policy as outlined in the policy document. The invention further allows the refinement and growth of the security policy over time.

One key aspect of the implementation is that the policy document is maintained and stored in human readable format, thus enabling interaction by the system administration. As a benefit of utilizing a symbolic classifier, the classification rules remain in human readable form throughout the process and can easily be manipulated by an external tool to create a form closer to prose. The implementation in human-readable form is accomplished by integrating classification techniques with well-known theory refinement techniques in such a manner as to create a self-reinforcing process that refines a policy document to better reflect the particulars of a given network and to assure that the policy is being enforced.

FIG. 3A illustrates the software modules that complete the various semi-automated processes illustrative embodiment of the invention, including theory refinement and policy updates. The software modules are provided to the processing system within the network that carries out the network administrative tasks and to which the network administrator has I/O access. These modules are illustrated as separate blocks within a larger block since the software for implementing these features may be packaged as a single software tool. Nomenclature utilized for each of the modules generally describes their respective functionality but does not limit the modules to just those specific features. The illustrated modules include data extractor 301, event-to-example converter 303, regular expression feature parser library 305, classifier 307, and theory refinement process 309. The functional features provided by each of these software blocks and their interaction within the security policy update and refinement process of the invention are described with reference to FIG. 3B.

Figures 3B, 3C:
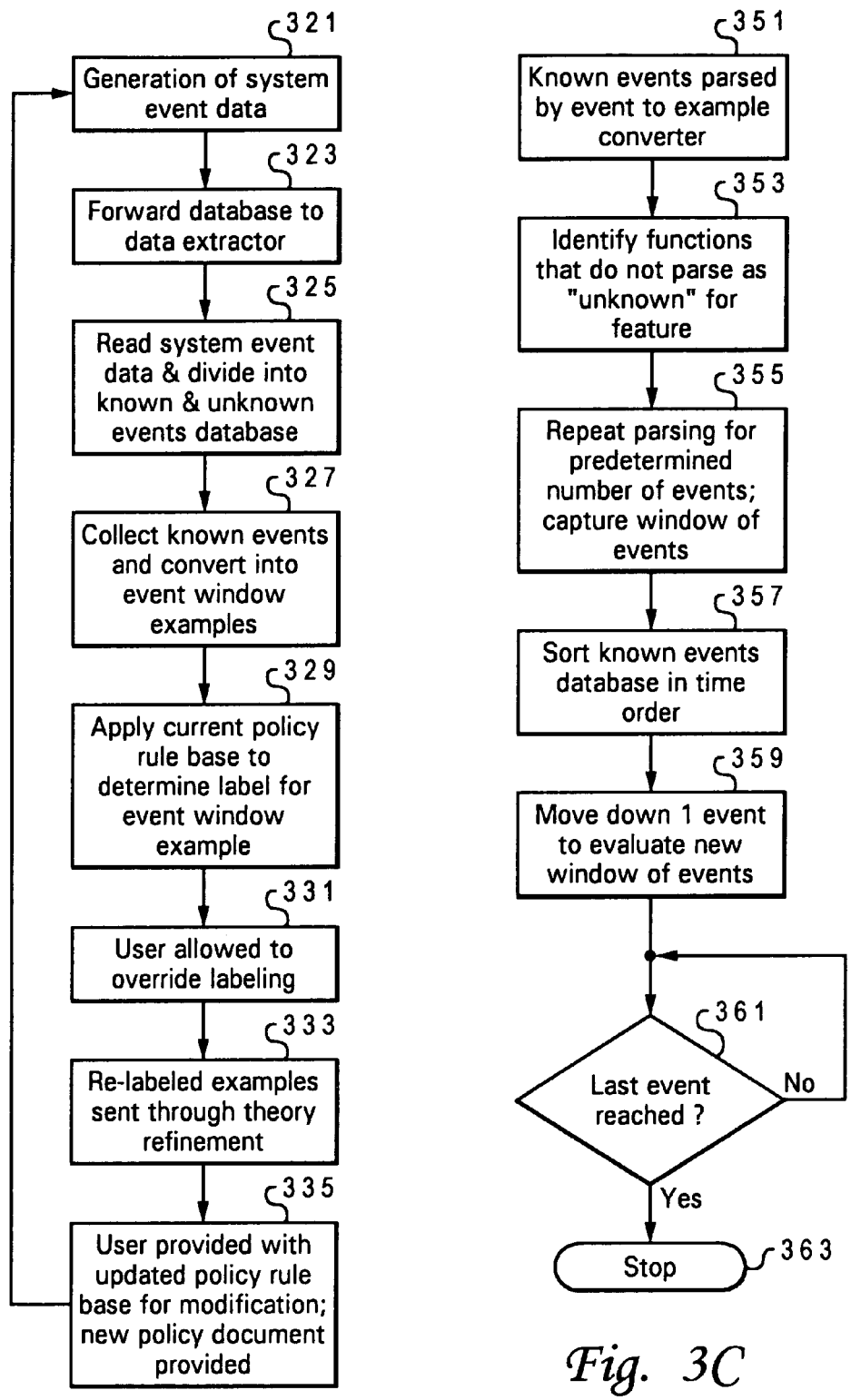
FIG. 3B is a flow chart illustrating the process of updating a policy document according to one implementation of the present invention.
FIG. 3C illustrates the process of generating event window examples from the database in accordance with one preferred embodiment of the invention.

Referring now to FIG. 3B, there is illustrated a flow diagram of the processing that occurs during implementation of one embodiment of the invention utilizing the software modules of FIG. 3A along with some user input. Notably, in FIG. 3B, the process does include 2 stages of human interaction. For this reason, the policy documents, event window examples, labels, etc., are all provided in human readable form making it easy for the human interaction component of the process to be completed. Each step of the process is referred to as a block illustrating the occurrence of a particular event.

The process begins at block 321, which indicates the generation of system event data. The system event data is collected within a database of all events of interest generated by the network as the system it operates. As described above and illustrated in FIG. 4, the database (or system log) is a text file. Each line of the text file is assumed to be a single event. At a predetermined (and pre-programmed) interval, the database is forwarded to the data extractor, as indicated at block 323 to begin the data check against the established policies within the policy document.

In an alternate embodiment, the system event data may also be generated from various points of the network and sent directly to the Data Extractor, bypassing the text file format and database storage. With either implementation, the processing of the events after the event arrives at the Data Extractor is the substantially the same.

As shown at block 325, the Data Extractor reads the system event data from the system log and divides it into two parts, a "Known Events" database and an "Unknown Events" database. Analysis of the Unknown Events database is described in the corelated patent application entitled "Suggesting Data Interpretations and Patterns for Updating Policy Documents," the entire contents of which are incorporated herein by reference. The Data Extractor achieves the separation of the database by parsing each line of the system log looking for information that identifies the types of events that the data extractor has awareness of.

Once the known events are collected, the known events are converted by the Event-to-Example converter into "event window examples" that are suitable for input to a classifier as indicated at block 327. The process of conversion of known events by the event-to-example converter into event window examples is illustrated in FIG. 3C.

As provided at block 351, the event-to-example converter parses the known events using the functions in the Regular Expression Feature Parser Library. These functions may be written in a variety of ways. For the illustrative embodiment, a language equipped with regular expression capability (such as the Perl language, for example) is utilized to parse each line according to a regular expression that describes the pattern of the feature sought in the event. Each function in the library is applied to the event and a determination is made whether the function parses on the event. Certain functions may fail to parse on the event and will be associated with a value of "unknown" for that feature as shown at block 353.

The Known Events database is sorted in the time order in which the events occurred as shown at block 355. Next, as indicated at block 357, the event-to-example parser repeats the step of identifying functions (as provided at block 353) for a predetermined number of events to capture a "window" of events that have occurred over time. Although described as a regular expression parser, the event-to-example convertor may be any sort of pattern matching engine that extracts features and forms examples. The utilization of a regular expression parser in the above description is provided solely for illustrative purposes.

Figure 4:
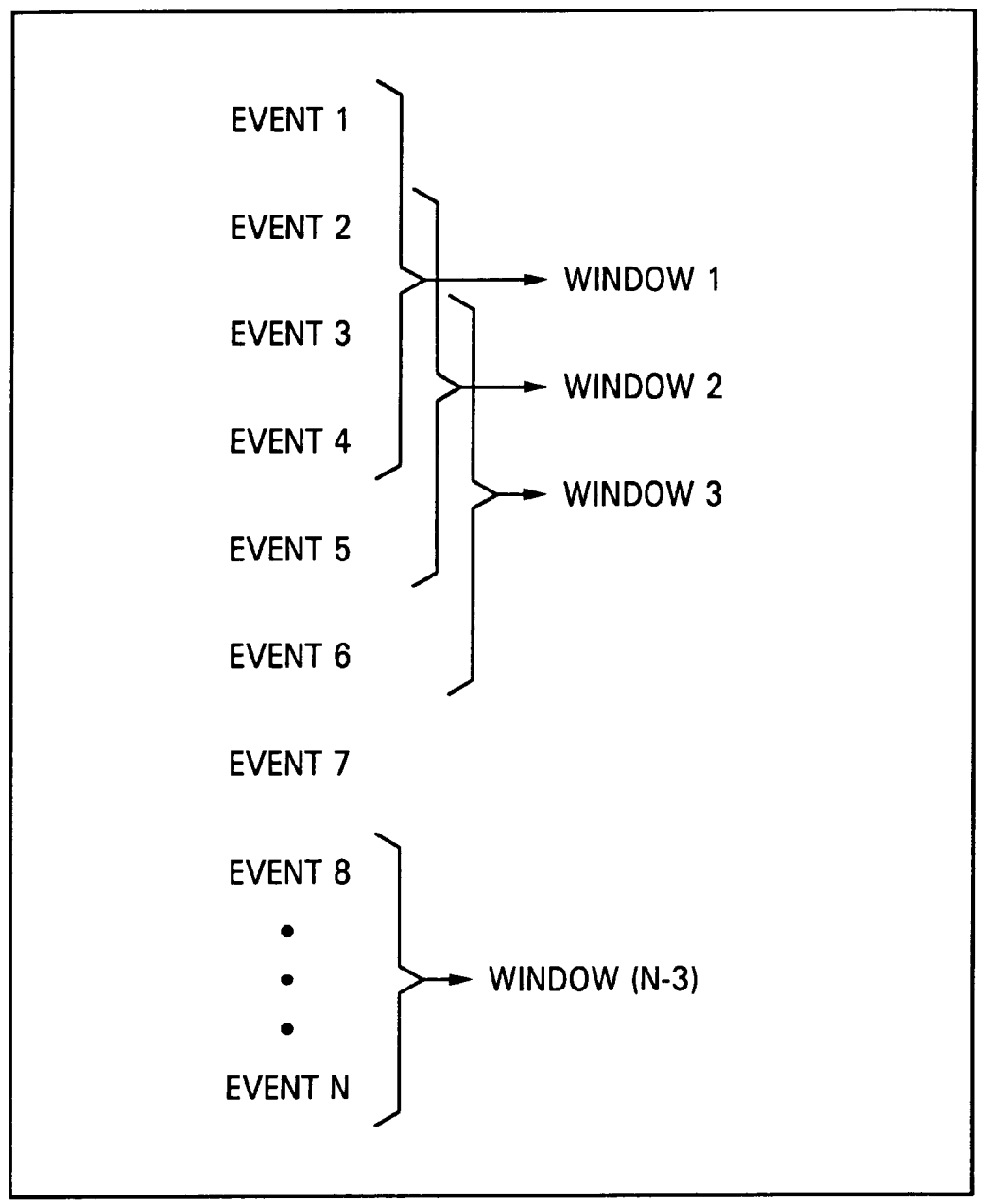
FIG. 4 illustrates the individual events within the database and the grouping of events to provide the event window examples according to one implementation of the present invention.

Following, the "window" of events is moved down in time one event as shown at block 359 and the process repeated. Thus, as illustrated in FIG. 4, for example, with an event window size of 4, the first window comprises events 1-4, the second window comprises events 2-5, the third window comprises events 3-6, etc. Then, a determination is made at block 361 whether the last window is reached. When the last window has not been reached, the process of shifting the window down one event at a time is repeated until the last possible window over the known events database is reached (i.e., for "n" events and window size "x", events (n−x+1) to (n)). Then the process ends as indicated at block 363.

The above conversion of events to event window examples is completed to take advantage of the Theory Refinement Process, which is now described. However, for the purposes of the present invention, Theory Refinement may be treated as a "black box" algorithm. As such, the important features of Theory Refinement are its interfaces, i.e., the input and output to the theory refinement process.

The Theory Refinement process utilized within the invention takes a "rule base" and a set of "examples" and utilizes the examples to make changes to the rule base. Typically the rule base is a derivative of first-order logic, namely, deductive rules. Each rule is an implication composed of a series of conjuncts (i.e., conditions which are logically "and-ed" together) and a conclusion that is justifiable if all conjuncts are logically true. Each example is an ordered pair, consisting of a "feature vector" paired with a "label." An example rule base (in first order logic) generated from a human language form can be found in Appendix A.

The feature vector is a vector (similar to an array) of values. Each element of the vector has an associated set of valid values. The label is the set of conclusions that the rule base should be able to derive starting with the feature vector as the initial set of facts.

The theory refinement algorithm provides several virtues that are utilized by the present invention. First, the algorithm may be used simply as a "classifier" systems. A classifier system is one that takes a set of examples that have no assigned labels and generates labels for those examples. In such a case, the rule base is utilized to determine all the conclusions that may be drawn from an example and the results are collected and saved as the label for that example.

Second, the theory refinement algorithm may be utilized either to modify an existing rule base or to create an entirely new rule base. In the latter case, the lack of rules causes the theory refinement algorithm to turn to its inductive engine to create or "induce" rules that account for the labeling provided in the examples. The inductive component of the theory refinement algorithm will include a set of specific inductive techniques. The inductive component of the theory refinement algorithm is critical, as the inductive component allows the theory refinement system to avoid generating a set of rules with inherent inconsistencies. At any point, theory refinement always has the option of throwing out its entire rule base to construct a new set of rules from scratch.

Notably, rather than throwing out the rule base, the theory refinement algorithm may randomly remove items from the knowledge base and/or introducing variations thereof. If the knowledge is crucial or the variations need to be corrected, they are corrected in the next iteration of the invention.

Returning now to FIG. 3B and the description of the process flow of the illustrative embodiment of the invention. Once the event-to-example converter has created the event window examples, the classifier applies the current policy rule base as shown at block 329 to determine which label to assign to each event window example. As a result of this step, a set of labeled event window examples is provided. Of course, the set of labeled event window examples contains the labeling that the current policy document would apply to the events that have been seen in the system.

The user (or system administrator) is then provided the opportunity to override the labeling produced for any of the labeled event window examples as shown at block 331. Thus, the event window examples and label are outputted in visible form (on a display monitor or in print), and the user utilizes input devices such as a mouse and keyboard to select and edit particular ones of the labels. If the user decides to override the labeling of a particular event window examples, the event window examples are identified by the background software monitoring changes to the labels as a set of re-labeled event window examples.

At this point in the process, the re-labeled examples are sent through theory refinement as shown at block 333, and theory refinement processes the re-labeled examples and then automatically rewrites the policy document so that the document is consistent with the re-labeling suggested by the user. Finally, an updated policy rule base is proposed with the changes suggested by the theory refinement, and the user is allowed to validate or modify the changes before those changes are accepted as the new policy document as shown as block 335.

Included among the important features of the present invention are the following: (1) At any point, the user may introduce new event types into the system by modifying the data extractor and the regular expression feature parser library. Once the modification occurs, the features from the new events can be automatically incorporated into the policy document. Also, (2) at any point the user may personally modify the policy rule base. This ability of the user to modify the rule base permits the user to simply input policy rules that he or she knows are required.

One important advantage provided by the invention is that the security policy document and the tools that monitor the guidelines set out in the document are no longer separate entities. Rather, the security policy document is now the input to the monitoring tool, providing the network administrator with immediate benefit from the policy document and avoiding a disparate relationship between policy and monitoring. Also, the policy document will better capture the security needs of the administrator as modifications to the policy will be spread over time through the course of the process and will be made only when policies are no longer adequate or accurate.

The approach provided by the invention applies to any sort of "next generation" network intrusion detection and management tool that integrates AI data-mining techniques with theory refinement techniques. Further, the processes of the invention can be abstracted to handle any sort of policy-driven tool as well. Thus, the invention provides the next step of progress in the network intrusion detection and management space.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

APPENDIX "A"

Examples for how to Translate English Sentences into First-Order Logic

If you would like to practise, there are some more problems (with sample solutions) in Nilsson, Section 15.6.2, and ((with-out sample solutions) in Russell and Norvig, Exercise 7.2. The following problems were inspired by them. In the following, it is important to remember the precedence of the operators, which are (from highest to lowest): ¬(NOT), ∧(AND), ∨(OR), ⇒(IMPLIES), ⇔(EQUIV). Notice also that there are always several (equivalent) sentences in first-order logic that correspond to a given English sentence. We give only one example.

All students are smart.
∀ x (Student(x) ⇒Smart(x))
There exists a student.
∃ x Student(x).
There exists a smart student.
∃ x (Student(x) ∧Smart(x))
Every student loves some student.
∀ x (Student(x) ⇒∃ y (Student(y) ∧Loves(x,y)))
Every student loves some other student.
∀ x (Student(x) ⇒∃ y (Student(y) ∧ ¬(x =y) ∧Loves(x,y)))
There is a student who is loved by every other student.
∃ x (Student(x) ∧∀ y (Student(y) ∧¬(x=y) ⇒Loves(y,x)))
Bill is a student.
Student(Bill)
Bill takes either Analysis or Geometry (but not both)
Takes(Bill, Analysis) ⇔¬Takes(Bill, Geometry)
Bill takes Analysis or Geometry (or both).
Takes(Bill, Analysis) ∨Takes(Bill, Geometry)
Bill takes Analysis and Geometry.
Takes(Bill, Analysis) ∧Takes(Bill, Geometry)
Bill does not take Analysis.
¬Takes(Bill, Analysis).
No student loves Bill.
¬∃ x (Student(x) ∧Loves(x, Bill))
Bill has at least one sister.
∃ x SisterOf(x,Bill)
Bill has no sister.
¬∃ x SisterOf(x,Bill)
Bill has at most one sister.
∀ x, y (SisterOf(x, Bill) ∧SisterOf(y, Bill) ⇒x=y)
Bill has exactly one sister.
∃ x (SisterOf(x, Bill) ∧∀ y (SisterOf(y, Bill) ⇒x=y))
Bill has at least two sisters.
∃ x, y (SisterOf(x, Bill) ∧SisterOf(y, Bill) ∧ ¬(x=y))
Every student takes at least one course.
∀ x (Student(x) ⇒∃ y (Course(y) ∧Takes(x,y)))
Only one student failed History.
∃ x (Student(x) ∧Failed(x, History) ∧∀ y (Student(y) ∧Failed (y, History) ⇒x=y))
No student failed Chemistry but at least one student failed History.
¬∃ x (Student(x) ∧Failed(x, Chemistry)) ∧∃ x (Student(x) ∧Failed(x, History))
Every student who takes Analysis also takes Geometry.
∀ x (Student(x) ∧Takes(x, Analysis) ⇒Takes(x, Geometry))
No student can fool all the other students.
¬∃ x (Student(x) ∧∀ y (Student(y) ∧¬(x=y) ⇒Fools(x,y)))

What is claimed is:

1. A computer implemented method of providing enhanced monitoring and enforcement of usage policy and security for a data processing system network, said method comprising:
   monitoring events occurring on said network;
   storing data identifying said events as system event data;
   analyzing said system event data with a set of initial policy constraints, wherein said analyzing step includes the steps of:
   retrieving said system event data from a network session;
   storing said system event data within a database, wherein said database is a text file of events of interest within the system;
   extracting system event data from said database by parsing each line of said database for identifying information of events that are known and labeled within the initial policy constraints; and
   labeling at least some system event data with a label that indicates when said at least some system event data complies or does not comply with said initial policy constraints; and
   enabling a system administrator to override at least some of the labeling to produce a set of re-labeled events;
   generating refined policy constraints by applying a theory refinement algorithm to the set of re-labeled events, the theory refinement algorithm configured to automatically modify the initial policy constraints to generate refined policy constraints that are consistent with the re-labeled events; and
   continuing monitoring and enforcement of said usage policy and security of said network via said refined policy constraints.

2. The method of claim 1, wherein creation of said initial policy constraints and said refined policy constraints includes implementing a dynamic, software-based data mining operation.

3. The method of claim 2, wherein said initial policy constraints and said refined policy constraints are provided in human readable form.

4. The method of claim 1, further comprising:
   converting at least some events occurring on said network into event window examples that are inputted into a classifier; and
   applying each of a plurality of functions in a function library to said events.

5. The method of claim 4, further comprising:
   repeating said applying each of a plurality of functions step for a predetermined number of events to capture a window of events as a window example; and
   sequentially shifting said window down one event at a time until a final event within said database falls within said window.

6. The method of claim 5, further comprising:
   applying current policy rules base to determine a labeling for each event window example;
   labeling an event window selected by a user for override of an initial labeling to produce a set of re-labeled event example windows; and
   applying theory refinement to the set of re-labeled event example windows to generate a new policy document that is consistent with the re-labeled event example windows.

7. The method of claim 4, wherein said labeling step includes:
   enabling said system administrator to re-label select ones of said event window examples; and
   providing the re-labeled event window example to a theory refinement algorithm designed to determine which policy should be modified to correct classification of events according to the re-labeling of the select event window example.

8. The method of claim 7, further comprising:
generating an updated policy document;
outputting said modified policy document to a system administrator for inspection, wherein said system administrator is able to modify said policy document and produce a new classifier; and
implementing monitoring and security operations utilizing said refined policy document with the modifications of said system administrator.

9. The method of claim 7, further comprising:
enabling system administrator validation of modification provided by said theory refinement process, whereby modification of a data extractor and a rule base of said classifier is completed.

10. A computer program product comprising:
a computer recordable medium; and
program code stored on said computer recordable medium that provides enhanced monitoring and enforcement of usage policy and security for a data processing system network, wherein said program code includes code for:
monitoring events occurring on said system;
storing data identifying said events as system event data;
analyzing said system event data with a set of initial policy constraints, wherein said program code for analyzing includes program code for:
retrieving said system event data from a network session;
storing said system event data within a database, wherein said database is a text file of events of interest within the system;
extracting system event data from said database by parsing each line of said database for identifying information of events that are known and labeled within the initial policy constraints; and
labeling at least some system event data with a label that indicates when said at least some system event data complies or does not comply with said initial policy constraints; and
enabling a system administrator to override at least some of the labeling to produce a set of re-labeled events;
generating refined policy constraints by applying a theory refinement algorithm to the set of re-labeled events, the theory refinement algorithm configured to automatically modify the initial policy constraints to generate refined policy constraints that are consistent with the re-labeled events; and
continuing monitoring and enforcement of said usage policy and security of said network via said refined policy constraints.

11. The computer program product of claim 10, wherein the program codes that creates said initial policy constraints and said refined policy constraints includes code for implementing a dynamic, software-based data mining operation.

12. The computer program product of claim 11, wherein said initial policy constraints and said refined policy constraints are provided in human readable form.

13. The computer program product of claim 10, further comprising program code for:
converting at least some events occurring on said network into event window examples that are inputted into a classifier; and
applying each of a plurality of functions in a function library to said events.

14. The computer program product of claim 13, further comprising program code for:
repeating said applying each of a plurality of functions step for a predetermined number of events to capture a window of events as a window example; and
sequentially shifting said window down one event at a time until a final event within said database falls within said window.

15. The computer program product of claim 14, further comprising program code for:
applying current policy rules base to determine a labeling for each event window example;
labeling an event window selected by a user for override of an initial labeling to produce a set of re-labeled event example windows; and
applying theory refinement to the set of re-labeled event example windows to generate a new policy document that is consistent with the re-labeled event example windows.

16. The computer program product of claim 13, wherein said program code for labeling includes program code for:
enabling said system administrator to re-label select ones of said event window examples; and
providing the re-labeled event window example to a theory refinement algorithm designed to determine which policy should be modified to correct classification of events according to the re-labeling of the select event window example.

17. The computer program product of claim 16, further comprising program code for:
generating an updated policy document;
outputting said modified policy document to a system administrator for inspection, wherein said system administrator is able to modify said policy document and produce a new classifier; and
implementing monitoring and security operations utilizing said refined policy document with the modifications of said system administrator.

18. The computer program product of claim 16, further comprising program code for:
enabling system administrator validation of modification provided by said theory refinement process, whereby modification of a data extractor and a rule base of said classifier is completed.

19. A computer implemented method for developing and maintaining a system security policy, comprising:
generating an initial security policy corresponding to system events and functioning as an initial symbolic classifier, said initial security policy including policy constraints;
comparing network system data against the classifier, wherein said comparing includes:
monitoring events occurring on said system;
storing data identifying said events as system event data;
analyzing said system event data via a software classifier that includes a set of initial policy constraints, wherein said program code for analyzing includes program code for:
retrieving said system event data from a network session;
storing said system event data within a database, wherein said database is a text file of events of interest within the system;
forwarding system event data from within said database to said software classifier at pre-established time intervals;
extracting system event data from said database by parsing each line of said database for identifying information of events that are known and labeled within the initial policy constraints;
dividing extracted system event data into a first database of known events and a second database of unknown events; and labeling each system event data with a label selected from among a first label that indicates when said system event data complies with said initial policy constraints and a second label that indicates that said system event data does not comply with said initial policy constraints; and re-labeling the system event data in response to the comparison to indicate when the system event data violates one of said initial policy constraints, wherein said re-labeling the system event data generates re-labeled data;

generating refined policy constraints by applying a theory refinement algorithm to the re-labeled data, the theory refinement algorithm configured to automatically modify the initial policy constraints to generate refined policy constraints that are consistent with the re-labeled data;

modifying the initial symbolic classifier to generate a new symbolic classifier based on the refined policy constraints; and substituting the modified symbolic classifier for the initial symbolic classifier.

20. A system that provides enhanced monitoring and enforcement of usage policy and security for a data processing system network, said system comprising:

a processor;

a computer recordable medium;

means for monitoring events occurring on said system;

means for storing data identifying said events as system event data on said computer recordable medium;

means for analyzing said system event data with a set of initial policy constraints, wherein said means for analyzing includes:

means for retrieving said system event data from a network session;

means for storing said system event data within a database, wherein said database is a text file of events of interest within the system;

means for extracting system event data from said database by parsing each line of said database for identifying information of events that are known and labeled within the initial policy constraints; and means for labeling at least some system event data with a label that indicates when said at least some system event data complies or does not comply with said initial policy constraints;

means for enabling a system administrator to override at least some of the labeling to produce a set of re-labeled events;

means for generating refined policy constraints by applying a theory refinement algorithm to the set of re-labeled events, the theory refinement algorithm configured to automatically modify the initial policy constraints to generate refined policy constraints that are consistent with the re-labeled events; and means for continuing monitoring and enforcement of said usage policy and security of said network via said refined policy constraints.

continuing monitoring and enforcement of said usage policy and security of said network via said refined policy constraints.

21. The system of claim 20, wherein:

said means for monitoring includes an initial policy document that comprises said initial policy constraints; and said means for initiating includes means for implementing a dynamic, software-based data mining operation.

22. The system of claim 21, wherein said initial policy constraints and said refined policy constraints are provided in human readable form.

23. The system of claim 20, further comprising:

means for converting at least some events occurring on said network into event window examples that are inputted into a classifier; and means for applying each of a plurality of functions in a function library to said events.

24. The system of claim 23, further comprising:

means for repeating said applying each of a plurality of functions step for a predetermined number of events to capture a window of events as a window example; and means for sequentially shifting said window down one event at a time until a final event within said database falls within said window.

25. The system of claim 24, further comprising:

means for applying current policy rules base to determine a labeling for each event window example;

means for labeling an event window selected by a user for override of an initial labeling to produce a set of re-labeled event example windows; and means for applying theory refinement to the set of re-labeled event example windows to generate a new policy document that is consistent with the re-labeled event example windows.

26. The system of claim 23, wherein said means for labeling includes:

means for enabling said system administrator to re-label select ones of said event window examples; and means for providing the re-labeled event window example to a theory refinement algorithm designed to determine which policy should be modified to correct classification of events according to the re-labeling of the select event window example.

27. The system of claim 26, further comprising:

means for generating a updated policy document;

means for outputting said modified policy document to a system administrator for inspection, wherein said system administrator is able to modify said policy document and produce a new classifier; and means for implementing monitoring and security operation utilizing said refined policy document with the modifications of said system administrator.

28. The system of claim 26, further comprising:

means for enabling system administrator validation of modification provided by said theory refinement process, whereby modification of a data extractor and a rule base of said classifier is completed.

* * * * *